May 16, 1972   JEAN-GABRIEL BARRE ET AL   3,663,679
METHOD OF MANUFACTURING FOOTWEAR

Filed May 6, 1969

United States Patent Office 3,663,679
Patented May 16, 1972

3,663,679
METHOD OF MANUFACTURING FOOTWEAR
Jean-Gabriel Barre, Lyon, and Jean-Marie Diez, Chassieu, France, assignors to Centre Technique du Cuir, Lyon, France
Filed May 6, 1969, Ser. No. 822,109
Claims priority, application France, May 9, 1968, 50,000; June 17, 1968, 50,114
Int. Cl. A43d 65/00
U.S. Cl. 264—244                8 Claims

ABSTRACT OF THE DISCLOSURE

A method of molding an article of footwear from a liquid product, characterized in that said liquid product is polymerizable and cross-linkable at ambient temperatures. Liquid products, such as polyesters, polyurethanes, or elastomers, of different hardnesses or colors can be used successively to fill only desired parts of the mold to create different zones. The desired zones of the article are manufactured by using interchangeable removable cores, and plugs with pour holes and vents, the casting of the article interrupted to permit removal of a core and insertion of a plug, but said interruption being of such duration that the previously cast material is not fully polymerized. The mold and last may be constituted of the same material as the article of footwear to be manufactured.

---

The present invention relates to a method of manufacturing footwear and to footwear produced thereby.

Footwear is composed of an upper element, and a sole as well as a certain number of other elements intended to ensure thereby comfort and rigidity. All these elements are fitted and connected together by adhesive means or stitching. The upper element itself results from the joining of various pieces of leather or similar material. In fact, it was quickly apparent that it was impossible to produce from materials in plates or in sheets, an upper element from a single piece since the loss of area would have been too great. In order to gain area, there is cut out by punch or paring knife the various pieces entering into the composition of the upper element, such as pattens, vamps, tongues, etc. . . . and they are joined together by stitching or gluing. It is also necessary to reinforce the upper element by cords, caps, counters, etc. . . . and to line them.

The fabrication of an upper element therefore comprises the following various operations:

cutting out the various pieces,
marking each piece in order to facilitate sorting,
tracing to guide the seams, decorative perforations, etc.,
paring the pieces in order to avoid surplus thickness,
sewing of the assembly and decorative stitching,
positioning of eyelets,
cementing and stitching of reinforcements, buckles, linings, etc., and
back stitching of the upper element.

All these operations are carried out on flat elements except the last one, which gives the upper element a three-dimensional aspect.

The upper element must then be fitted on a last of wood or other material, in order to shape it to the volume occupied by the foot.

In order to facilitate later modification of the shape of the footwear, the upper element is not fixed directly to the last, but to a first assembly form.

The assembly of an upper element consists of the following sequence of operations:

shaping the back of the upper element on the back part of the last,
fitting of the sides, arches and caps, and
fitting of the back.

All these operations may be effected by nailing or gluing.

Such a method of manufacture therefore involves a considerable succession of operations, preventing mass production. In addition, it necessitates the employment of considerable and costly material, as well as very specalized skill, which has the result of considerably increasing the cost price of the footwear.

The same is true for joining the upper element to the sole which can be effected by sewing or gluing.

According to another method, the sole may be connected to the upper element, by overmolding that is to say by vulcanization, injection or casting. The operations which precede vulcanization are similar to those which precede reactivation in the process of gluing, since the vulcanization consists of forming directly on the upper element a sole of natural or synthetic rubber. With the upper element placed in a mold with the sole in the form of granules or of blocks, the mold is closed and vulcanization intervenes after a time varying from five to twenty minutes, under a pressure of 30 kg. per cm.$^2$ and at temperatures of the order of 150 to 160° C., which limits the number of materials which can enter into the constitution of upper element. Moreover, molds are of high cost price, since they must resist heat and pressure.

The difficulties encountered in the injection process are comparable with those of the vulcanization process by reason of the similar conditions of temperature and of pressure which it is necessary to withstand.

In the casting method, the same difficulties are not encountered, but it has been shown that the mechanical strength of the products obtained is insufficient.

There is also known a method called flushing, which consists of filling a mold, having the outer form of the model to be produced, with a liquid product, then heating the mold, in order to gel this liquid, so that there is formed a skin in contact with the walls of the mold, the excess liquid being then poured out to obtain the inner volume of the footwear.

The main drawback of this method resides in the fact that it can only be put into practice at high temperatures involving considerable expense.

It is an object of the present invention to overcome these drawbacks.

Other objects and advantages will emerge from the description which follows.

According to the invention there is provided a method of manufacturing footwear consisting of molding each footwear article in one or several operations, by means of a mold comprising a core or inner last, and an outer casing from liquid or viscous products, polymerizable and cross-linkable in ambient temperatures.

According to another aspect of the invention there is provided a mold for manufacturing footwear comprising an inner last and an outer shell adapted for performing the method of the invention.

According to a further aspect of the invention there are provided articles of footwear whenever produced by the method of the invention.

An essential advantage of this method resides in the fact that the two elements of the mold, namely the last and the shell, can be of molded material, of the same nature as the footwear or of different nature, which considerably reduces their cost price and consequently the price of the footwear.

Another advantage of this method results from the fact that the molding being carried out in cold ambient temperatures, and without pressure, it is possible to use as an inner last the foot for which the footwear is intended.

Advantageously and especially in the case where it is constituted by the foot of the user, the last is covered before casting or injection, with a coating or sock of a material improving the comfort of the footwear, such as leather or similar material.

In the case where there is desired in the finished footwear, zones of hardness or of various colors, the casting is interrupted after the introduction into the mold of a first product, polymerizable and cross-linkable in cold ambient temperatures and having to constitute the zone of greatest hardness or of first color, then is followed by means of a second product of lesser hardness or of another color, the mold being positioned so that the line of demarcation between the two parts of the footwear having different hardnesses or colors, is situated in a horizontal plane and the quantity of the first cast product being measured to ensure the filling of the mold up to the level of the aforesaid horizontal plane. As will be evident to those skilled in the art, the second product will be introduced into the mold before the first product has polymerized in order to insure effective bonding between the products.

In the case where the upper of the footwear must be reinforced in entirety or in part, which is the case especially for ski boots or protective boots, the casting is interrupted for the positioning, after opening the mold, of a reinforcement or protective product which, in the course of a second casting, the mold being closed again, is coated with a skin of the desired thickness of the cast material.

This process enables finally the easy positioning of auxiliary members of the footwear article, such as a hookplate for ski boots, tongues or other members; it suffices for this to position these members correctly in the mold before casting.

As is easily envisaged, this method enables not only any condition of solidity and of comfort desired to be obtained, but in addition, it ensures for the footwear an absolute fluid-tightness without long and brudensome assembly, gluing, stitching or other operations. As a result this method enables a very high production rate and enables therefore the manufacture of footwear at a very much lower cost price.

Products perfectly suitable for the application of this method are polyesters, polyurethanes and certain elastomers.

In the case where the line of separation of the different zones of hardness or of colors cannot be placed in a horizontal plane by suitable positioning, according to a modification of this method, there is provided in the casing of the mold, removable cores adapted to fill, in the mold cavity, the zones corresponding to the parts of the footwear having to have different mechanical or color characteristics relative to the other parts of the footwear, to effect a first casting while these removable cores are in position, using therefor a first product of which the characteristics correspond to those desired for the major part of the footwear, then effecting as many other secondary castings as there are zones which have to have different characteristics, these secondary castings being effected after withdrawal of the removable cores and their replacement by plugs in which pouring holes and vent holes are arranged.

In order that the invention may be more fully understood several embodiments of the application of the method according to the invention are described below purely by way of illustrative but non-limiting examples, with reference to the accompanying diagrammatic drawing.

Figure 5:
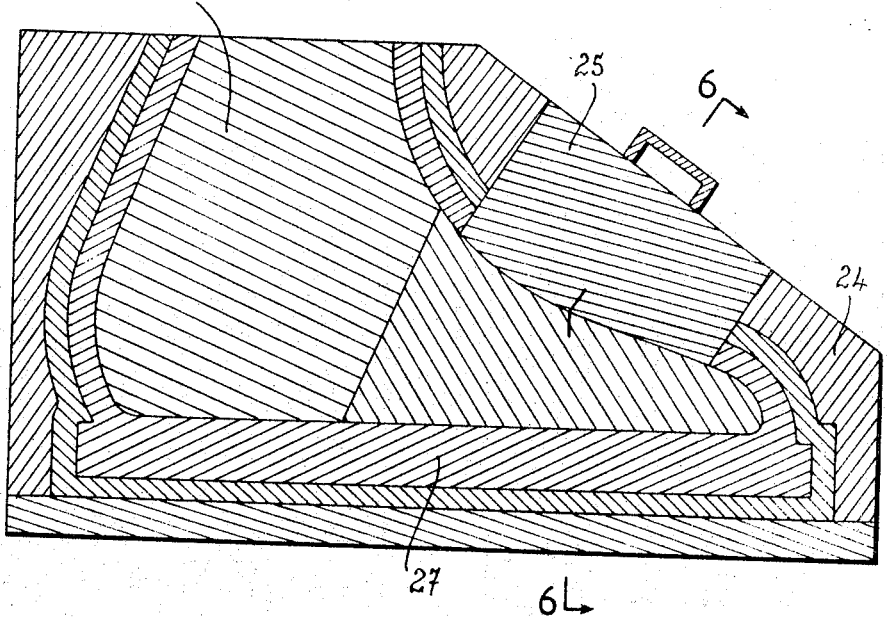
Figure 6:
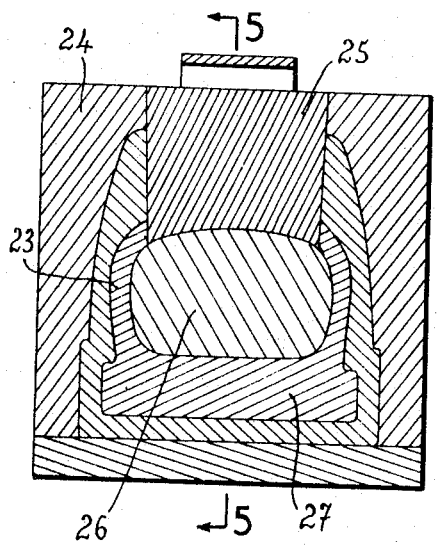
Figure 7:
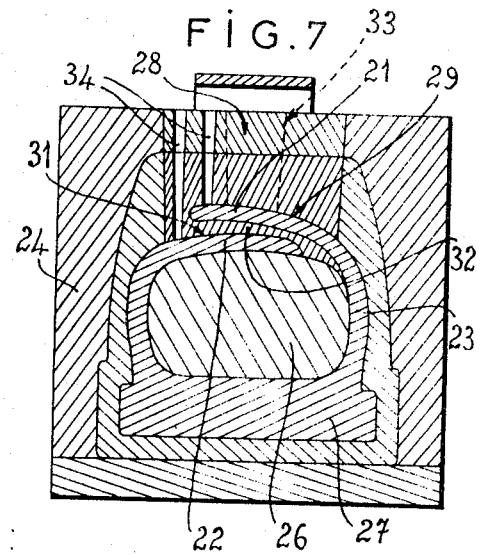

FIGS. 5 and 6 are sectional views taken along the lines 5—5 of FIG. 6 and 6—6 of FIG. 5 respectively, showing the mold in the course of the first casting of a third embodiment of the invention; and FIG. 7 is a sectional view similar to that of FIG. 6, showing the mold in the course of the second casting.

Figure 1:
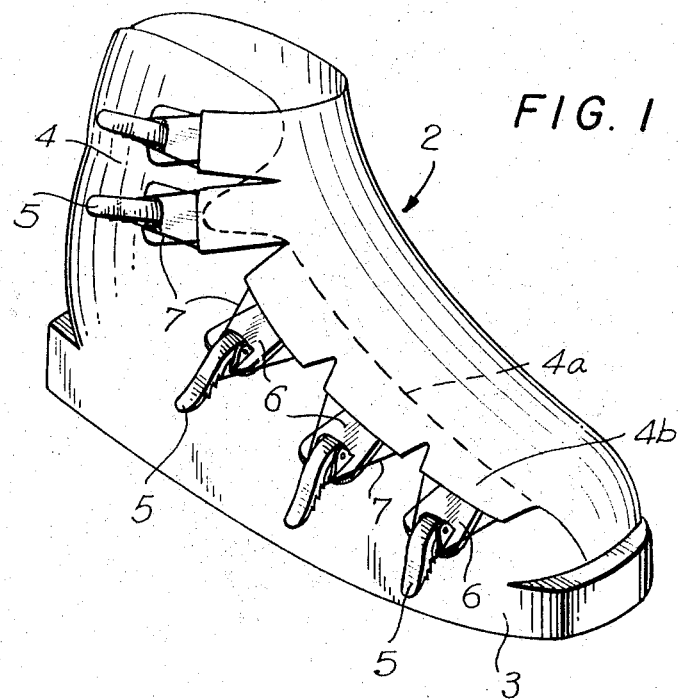
FIG. 1 shows, in perspective view, a ski boot manufactured by the application of one embodiment of the method according to the invention.

Referring now to the drawings, FIG. 1 shows a ski boot 2 comprising a sole 3 and an upper element 4 in which the top of the instep is constituted by two inner and outer flaps 4a and 4b respectviely intended to be crossed over one another. The closing of this boot is ensured by hooks with multiple notches 5, hinged on base plates 6, fixed to the upper element part of the upper 4 of the flap 4b is an integral part. These hooks 5 are intended to receive shackles 7 which are fixed at the edge of the flap 4b.

Figure 3:
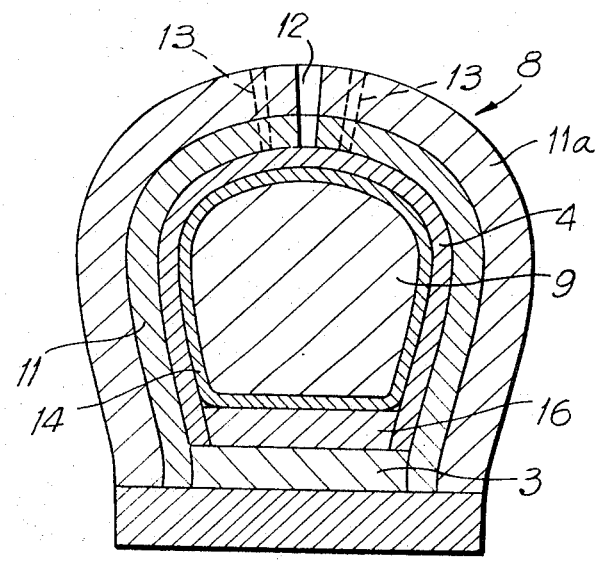
FIG. 3 is a sectional view taken along the line 3—3 of FIG. 2.
Figure 2:
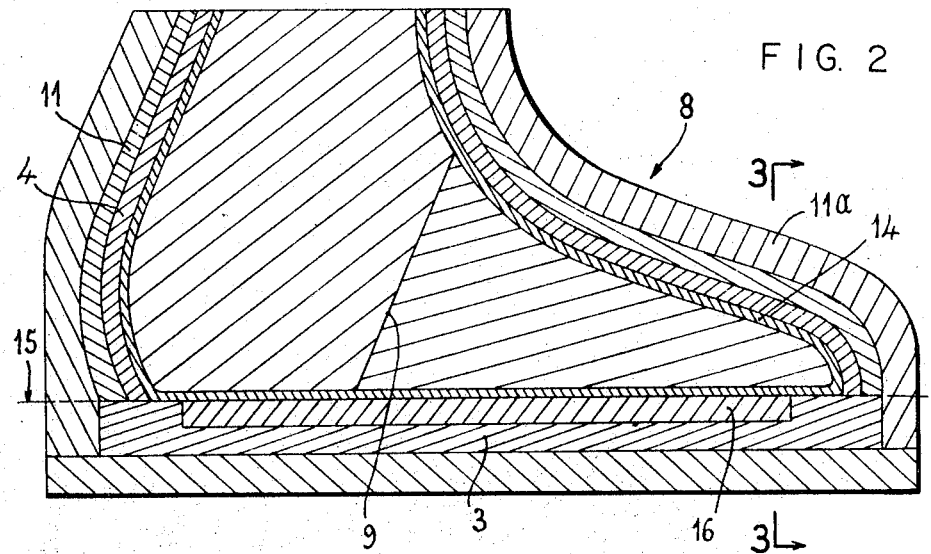
FIG. 2 is a longitudinal sectional view of the boot of FIG. 1, before it is removed from its mold.

According to the invention, and as illustrated by FIGS. 2 and 3, the boot 2 is produced by the casting in a mold 8 of a liquid or viscous product polymerizable in cold ambient temperatures, such as polyester, polyurethane or certain elastomers.

This mold comprises two essential parts, an inner form or last 9 and an outer shell or casing 11. The last 9 and the shell 11 are produced by casting, inside and outside a footwear article of the desired type, a liquid or viscous product, polymerizable in cold ambient temperatures, and which may be identical with that of which the footwear article is constituted. When the mold is worn, a footwear article from production may be used for the fabrication of a new mold.

The outer shell 11 of molded material is surrounded by a rigid shell 11a, which avoids any deformation during the fabrication of the footwear. This rigid shell 11a is obviously constituted of several elements, for example, three, enabling its dismounting for the opening of the mold. It comprises, in addition, one or more pouring gates 12, and one or more vent holes 13.

During the fabrication of the boot 2, preferably before casting, the last 9 is covered with a coating or sock 14 of leather or similar material.

Before closing the mold 8, the base plates 6 of the hooks 5 and shackles 7 are placed in the mold in order to be overmolded by the product which has to constitute the upper element 4 of the boot. This positioning can be effected easily by means of impressions produced in the outer shell 11.

When it is desired for the upper element 4 to have a lesser hardness than the sole 3, it suffices to position the mold 8 so that the separation level 15 between the sole 3 and the upper element 4 is horizontal, and to pour in the product having the greatest hardness, in an amount corresponding to the volume of the sole 3. An economy of material can be realized by previously placing in the mold 8 under the last 9 a filler material 16, such as wood or the like whose presence can, in addition, contribute to the rigidity of the sole.

After the first casting, and without opening the mold, it suffices to effect a second casting to fill the part of the mold 8 corresponding to the volume of the upper element 4 by means of the product of lesser hardness.

Figure 4:
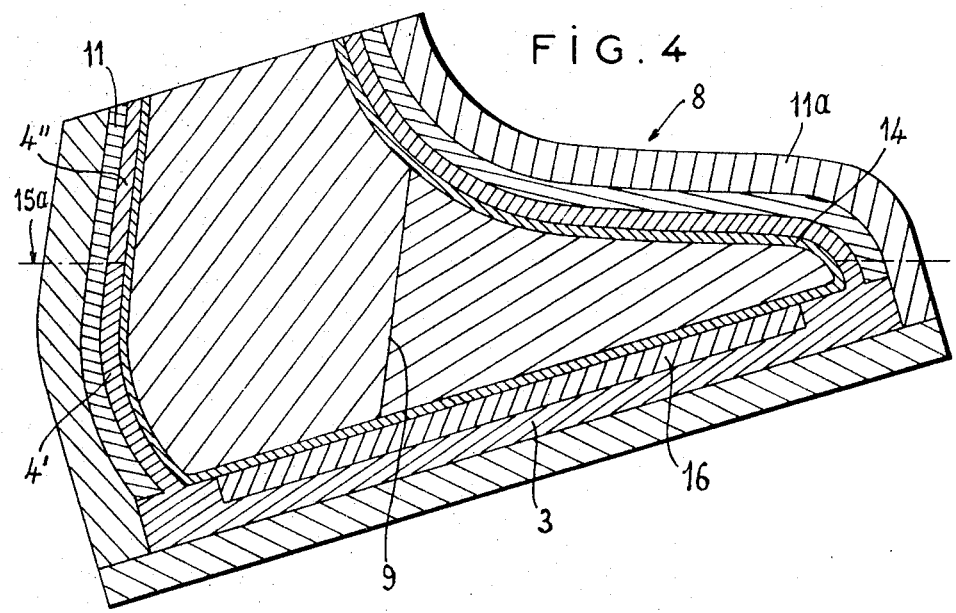
FIG. 4 is a similar sectional view to FIG. 2 illustrating a second embodiment of the invention.

FIG. 4 illustrates a modification of this method according to which it is possible to obtain, on a part 4' of the upper 4 the same hardness as for the sole 3.

For this, it suffices to position the mold 8 so that the line of demarcation 15a between the parts 4' and 4" of the upper 4 is located in a horizontal plane.

As will be easily envisaged, it would also be possible to provide for the part 4' of the upper 4 a hardness intermediate that of the sole 3 and the part 4" of the upper element 4. It will suffice for this to carry out three castings, the first corresponding to the first phase of the method illustrated by FIG. 2, and the second corresponding to the first phase of the method illustrated in FIG. 4.

FIGS. 5 to 7 illustrate a second embodiment of the application of this method in the case where it is desired to obtain, for flaps 21 and 22, of a ski boot, a flexibility greater than for the upper 23 of this boot.

To this effect, there is provided, in the mold 24, a removable core 25 adapted to fill, once the mold 24 is closed again over the last 26, zones corresponding to the flaps 21 and 22. With the core 25 in place, it is possible to effect the first casting with a product of which the characteristics correspond to those desired for the upper element 23.

If the same hardness is desired for the sole 27 and for the upper element 23, this first casting is effected in a single operation. Naturally, if different hardnesses are desired for the sole 27 and the upper element 23, this first casting must be effected in two stages as is provided in the preceding example.

Once this first casting is completed, the core 25 is withdrawn and replaced by a plug 26 comprising two cavities 29 and 31 separated by a veiling element 32 corresponding each to one of the flaps 21 and 22 respectively.

These two cavities 29 and 31 are open at the side corresponding to the line of juncture of the flap under consideration and of the upper element 23. In addition, they communicate with one another and their end corresponding to the front of the boot, that is to say in the zone where the flaps 21 and 22 are connected to one another.

It is in this zone of the plug 28 that there are provided a pouring hole 33 and vent holes 34 enabling the production of flaps 21 and 22 of a more flexible material than the upper element 23 and the sole 27 of the boot, this in the course of an auxiliary casting, by means of a product having the desired characteristics.

As goes without saying and as emerges moreover from that which precedes, the invention is not limited to the embodiments of this method which have been described above by way of non-limiting example; it embraces, on the contrary, all changes and modifications incorporating the essential concept of the invention as defined in scope by the appended claims.

We claim:

1. A method of manufacturing an article of footwear having a rigid sole and a flexible upper, said method comprising forming a mold of an inner last element and an outer casing element, pouring into the mold a first liquid product at ambient temperature, said liquid product being polymerizable at ambient temperature, said liquid product filling said mold to a level to form at least part of said rigid sole, pouring into the mold a second liquid product at ambient temperature and which polymerizes at ambient temperature, said second liquid product having a different characteristic from the first liquid product and being introduced into the mold before the first liquid product has polymerized to form at least part of said upper, mounting in the casing element of the mold a removable core which remains in place during pouring of the first and second liquid products to provide an aperture in the upper during the forming thereof, removing the core from the mold while the rest of the mold remains intact, said core being removed before the polymerizing of the material of the upper, inserting a plug in the space formed by the removal of said core, the plug being formed with a hole for supply of liquid product and with cavities to form overlapping flaps for the article of footwear, and introducing liquid product which is polymerizable at ambient temperature into said cavities via the supply hole, before the polymerizing of the material of the upper, to cause the last said liquid product to form said flaps on the upper.

2. A method as claimed in claim 1 comprising forming a dismountable, rigid, outer shell on the casing element.

3. A method as claimed in claim 1 comprising forming the last element and casing element of the mold from at least one the liquid products which form said article of footwear, and polymerizing said liquid product of the last element and casing element prior to the pouring thereinto of the liquid products to form the article of footwear.

4. A method as claimed in claim 1 wherein said last element is formed by the foot of the person for whom the article of footwear is intended.

5. A method as claimed in claim 1 comprising covering said last element before the first liquid product is poured into the mold, with a lining material to improve the comfort of the footwear.

6. A method as claimed in claim 1 wherein the molding of the footwear is interrupted for a period to position a reinforcement after opening the mold, closing the mold and casting a skin of liquid product of a desired thickness on the reinforcement, said latter period of interruption being less than the time necessary for the already poured product to polymerize.

7. A method as claimed in claim 1 comprising positioning an auxiliary member of the footwear in the mold before molding and fixing the auxiliary member to the upper of the footwear by overmolding.

8. A method as claimed in claim 1 wherein said liquid product is polyester, polyurethane or an elastomer.

References Cited

UNITED STATES PATENTS

| | | | |
|---|---|---|---|
| 2,470,089 | 5/1949 | Booth | 264—245 |
| 3,244,787 | 4/1966 | Levitt | 264—223 |
| 3,302,244 | 2/1967 | Ludwig | 264—245 |
| 3,363,039 | 1/1968 | Satoshi | 264—255 |
| 3,428,725 | 2/1969 | Delmonte | 264—338 |
| 2,357,360 | 9/1944 | Rollmann | 264—244 |
| 3,228,819 | 1/1966 | Bingham, Jr. | 264—244 X |
| 3,328,499 | 6/1967 | Barnette | 264—255 X |

ROBERT F. WHITE, Primary Examiner

T. P. PAVELKO, Assistant Examiner

U.S. Cl. X.R.

264—255